United States Patent [19]
Hasuda et al.

[11] Patent Number: 5,727,246
[45] Date of Patent: Mar. 10, 1998

[54] SHUTTER DEVICE

[75] Inventors: Masanori Hasuda, Yokohama; Akira Katayama, Koganei; Yukio Uemura, Musashino; Tetsuro Goto, Funabashi, all of Japan

[73] Assignee: Nikon Corporation, Tokyo, Japan

[21] Appl. No.: 699,185

[22] Filed: Aug. 19, 1996

Related U.S. Application Data

[63] Continuation of Ser. No. 294,989, Aug. 24, 1994, abandoned, which is a continuation-in-part of Ser. No. 191,108, Feb. 3, 1994, abandoned.

[30] Foreign Application Priority Data

Feb. 3, 1993 [JP] Japan .................. 5-2456 U
Aug. 25, 1993 [JP] Japan .................. 5-046218

[51] Int. Cl.[6] ............................................. G03B 17/02
[52] U.S. Cl. .................................. 396/486; 396/542
[58] Field of Search ............................ 396/452, 486, 396/542

[56] References Cited

U.S. PATENT DOCUMENTS

| 3,670,639 | 6/1972 | Harnden . |
| 4,297,018 | 10/1981 | Murakami et al. . |
| 4,907,027 | 3/1990 | Kobe et al. . |
| 4,926,202 | 5/1990 | Fukuda et al. . |
| 4,963,908 | 10/1990 | Toyoda et al. . |

*Primary Examiner*—David M. Gray
*Attorney, Agent, or Firm*—Staas & Halsey

[57] ABSTRACT

A shutter device includes shutter blades, a flexible printed circuit board electrically connectable to a camera main body, a shutter base plate having an aperture, a shutter drive mechanism arranged in the vicinity of the aperture on the shutter base plate for driving the shutter blades, and electrical parts arranged in the vicinity of the aperture at one area other than the area of arrangement of the shutter drive mechanism. The flexible printed circuit board is connected to the shutter drive mechanism and the electrical parts and continuously arranged along the periphery of the aperture.

9 Claims, 12 Drawing Sheets

SHUTTER DEVICE

This application is a continuation of application No. 08/294,989, filed Aug. 24, 1994, now abandoned, which is a continuation of 08/191,108 filed Feb. 3, 1994, now abandoned.

BACKGROUND OF THE INVENTION

1. Field of the Invention

The present invention relates to a shutter device and, more particularly, to a shutter device having a traveling state detection unit for detecting a traveling state of shutter blades.

Further, the present invention relates to a shutter device and, more particularly, a shutter device for improving electric connections between parts employed for a unit shutter and internal parts of a camera main body.

2. Related Background Art

In recent years, shutter speed has become as fast as 1/8000 sec, which is of importance in terms of specification. At the same time, there has been an increased frequency of using the strobe. It is required that a flash sync speed be increased so as to take a picture in a bright environment.

For this purpose, a remarkable increase in terms of a tripping speed of shutter blades by enhancing a spring force. Besides, the control has to be done to narrow a slit width between a leading curtain and a trailing curtain. For this purpose, in the case of a high shutter speed exceeding 1/8000 sec, even if controlled accurately, which a desired shutter speed may not be obtainable. Although such a phenomenon is not discovered until the film is developed, there is proposed a shutter device constructed so that the shutter speed can be detected by providing a traveling state detection unit of the shutter blades.

The shutter device comprises a shutter base plate having an aperture, a shutter drive mechanism for driving shutter blades through an arm, and a traveling state detection unit for the shutter blades, and the shutter drive mechanism includes electrical parts such as a controlling electromagnet.

When such a shutter device is built in a camera main body and electrically connected to the electrical parts of the camera main body, it must be separately connected to the electrical parts of the camera main body because the electrical parts of the shutter device such as the traveling state detection unit and the electromagnet of the shutter drive mechanism are distributed at several points on the shutter base plate. As a result, the assembly time is long and the cost increases.

SUMMARY OF THE INVENTION

It is an object of the present invention to provide a shutter device which does not take much assembly time and suppresses a cost to low level.

In order to achieve the above object, the shutter device of the present invention comprises a shutter drive mechanism for controlling the drive of shutter blades through an arm, a traveling state detection unit for detecting a traveling state of the shutter blades, a shutter base plate having an aperture formed therein and having the shutter drive mechanism and the traveling state detection unit arranged in an area other than the area of the aperture, and a flexible printed circuit board arranged in an area of the shutter base plate other than the area of the aperture for electrically connecting with the shutter drive mechanism and the traveling state detection unit.

In accordance with the present invention, since the flexible printed circuit board is arranged in the area of the shutter base plate outside of the area of the aperture, the shutter drive mechanism and the traveling state detection unit can be electrically connected to the printed circuit board, and the connecting part for connecting the shutter drive mechanism and the traveling state detection unit to electrical parts of the camera main body can be arranged at one area on the flexible printed circuit board. As a result, the shutter drive mechanism and the traveling state detection unit need not be separately electrically connected to the electric parts of the camera main body and the assembly time is saved.

Further, since only the flexible printed circuit board is added, the cost reduction is attained.

It is another object of the present invention to attain a high-efficiency mounting configuration of the camera as a whole without installing the FP boards upwardly and downwardly of the aperture of the shutter base plate.

To accomplish the above object, according to the present invention, in a shutter device having: one of parts employed for a unit shutter; a shutter drive mechanism for drive-controlling shutter blades through an arm; and a shutter base plate formed with an aperture for an exposure, the shutter base plate being constructed such that the shutter drive mechanism is disposed on one side of two right-and-left sides of the aperture, excluding an area of the aperture, while one of the parts is disposed on the other side, there is provided the improvement comprising a connection unit for electrically connecting one of the parts to the parts disposed off the shutter base plate when installing the shutter base plate in an interior of a camera main body among the internal parts of the camera main body, wherein the connection unit is disposed in an area other than the upper and lower areas of the aperture in the shutter base plate.

One of the parts described above involves the use of, e.g., the traveling state detection unit. Provided is the connection unit for electrically connecting the traveling state detection unit to the parts disposed off the shutter base plate when the shutter base plate among the internal parts of the camera main body is installed in the interior of the camera main body. The connection unit is placed in the area other than the areas positioned upwardly and downwardly of the aperture in the shutter base plate. With this arrangement, it is possible to secure spaces for installing a shake preventive mechanism in traveling the shutter blades and a finder unit of the camera, respectively. The high-efficiency mounting configuration of the camera as a whole can be attained simply by use of the above connection unit.

Note that one of the parts described above may not be limited to the traveling state detection unit according to the present invention.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Figure 1:
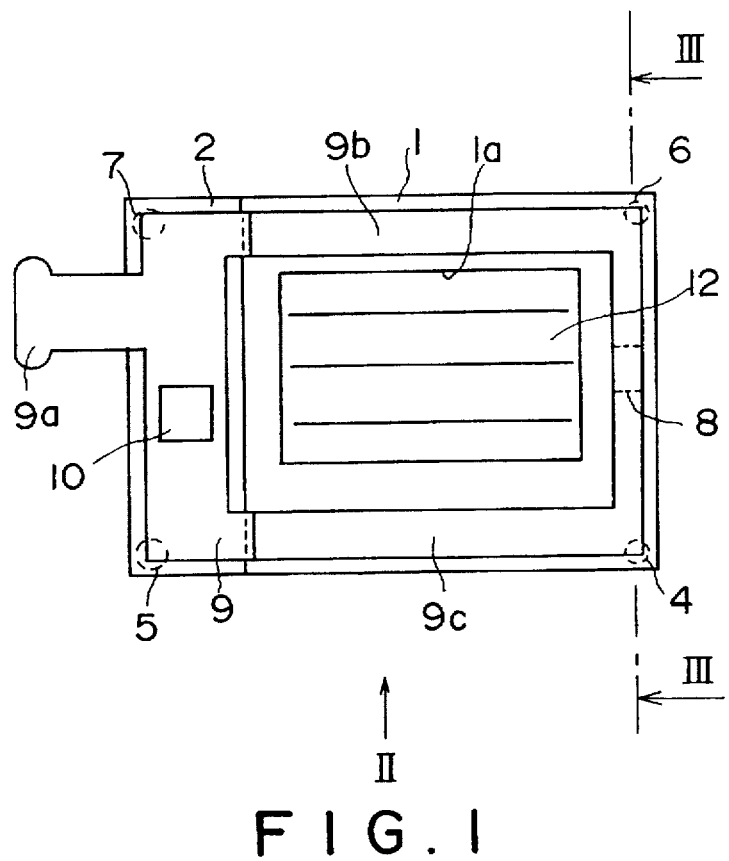
FIG. 1 is a top view of a first embodiment of a shutter device of the present invention.
Figure 2:
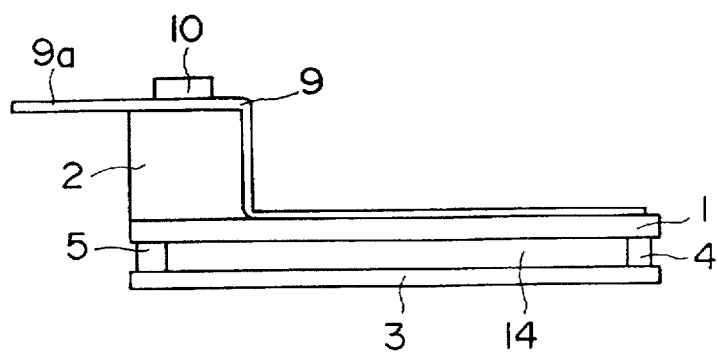
FIG. 2 is a side view of the shutter device as seen from an arrow line II—II of FIG. 1.
Figure 3:
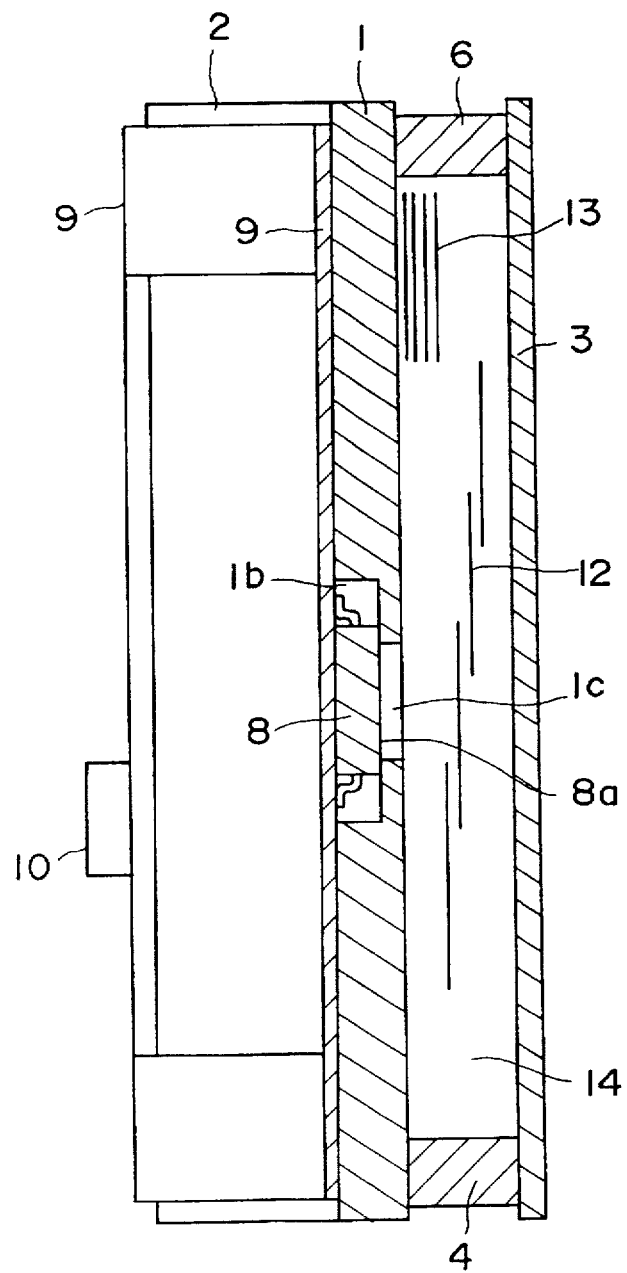
FIG. 3 is a sectional view of the shutter device taken along a line III—III of FIG. 1.

FIG. 1 shows a top view of a first embodiment of a shutter device of the present invention, and FIG. 2 shows a side view of the shutter device as seen from an arrow line II—II of FIG. 1. FIG. 3 shows a sectional view taken along a line III—III of FIG. 1.

In FIG. 1, numeral 1 denotes a base plate in which an aperture 1a to expose a light to a film, not shown, is formed. Numeral 2 denotes a shutter drive mechanism for releasing and charging shutter blades. The drive mechanism 2 is arranged on the base plate 1 as shown in FIG. 2. The drive mechanism 2 includes a control unit for controlling a shutter speed when the shutter blades are released and the control unit comprises an electromagnet and other electrical parts.

Numerals 4, 5, 6 and 7 in FIG. 1 denote shafts mounted on the base plate 1, and a cover plate 3 and the base plate 1 are connected in facing relation with a spacing therebetween by the shafts as shown in FIG. 3. A blade chamber 14 is formed in the spacing, and a shutter leading curtain 12 and a shutter trailing curtain 13 are arranged therein. An aperture, not shown, which is substantially same size as the aperture of the base plate 1, is formed in the cover plate 3.

Numeral 8 in FIG. 1 denotes a traveling state detection unit for detecting a traveling state of the shutter blades. As shown in FIG. 3, the detection unit 8 is covered by a flexible printed circuit board 9 arranged in a recess 1b of the base plate 1. A hole 1c oriented rightward in FIG. 3 is formed in the recess 1b of the base plate 1 through the base plate 1 and the hole 1c is used as a hole by which the traveling state detection unit 8 detects the traveling states of the shutter leading curtain 12 and the shutter trailing curtain 13.

The printed circuit board 9 is bonded to the shutter base plate 1 and the drive mechanism 2 by bonding or other known means as shown in FIG. 2. A connecting part 9a is arranged at one area of the flexible printed circuit board 9, and the connecting part 9a is used to electrically connect electrical parts 10 arranged on the printed circuit board 9, the shutter drive mechanism 2 and the traveling state detection unit 8 to the camera main body, not shown.

A pattern area 9b is arranged in the shutter substrate above the aperture 1a of FIG. 1 in the flexible printed circuit board 9 and a pattern area 9c is also arranged below the aperture 1a. The printed circuit board 9 including the pattern areas 9b and 9c and the connecting part 9a is not found in a prior art device and it is newly added in the present invention.

A pattern, not shown, is formed on one side or both sides of the flexible printed circuit board 9, including the pattern areas 9b and 9c, and the electrical parts of the drive mechanism 2, the traveling state detection unit and the electrical parts 10 are electrically connected to the patterns formed on the flexible printed circuit board 9. They are electrically connected to the connecting part 9a of one area so that the electrical parts of the camera main body and the above unit are electrically connected through the connecting part 9a. The electrical part 10 may include a plurality of parts, and it may be arranged on the camera main body instead of on the base plate 1, as may be required.

Numeral 12 in FIG. 1 denotes the shutter leading curtain. In the state shown in FIG. 1, it is spread to cover the aperture 1a.

Figure 4:
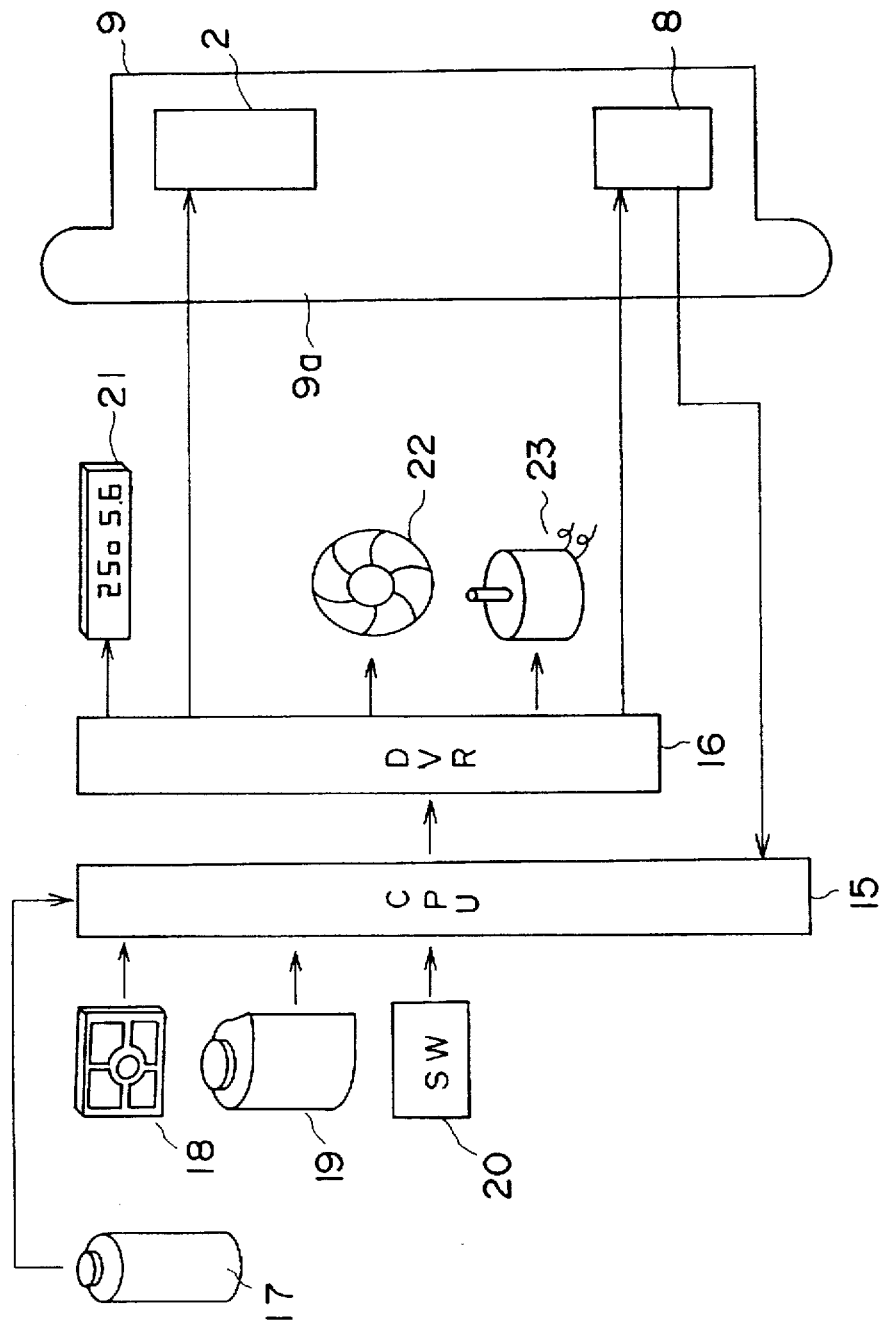
FIG. 4 is a block diagram of a configuration of an electrical circuit in a camera main body when the shutter device of FIG. 1 is built in the camera main body.

FIG. 4 shows a block diagram of a configuration of an electrical circuit in the camera main body when the shutter device in accordance with the first embodiment is built in the camera main body. The circuit includes a battery 17 on the left hand of the drawing as a power supply, and the flexible printed circuit board 9 having the shutter drive mechanism 2 and the traveling state detection unit 8 is shown on the right hand of the drawing.

Numeral 18 denotes a photo-metering unit for measuring the brightness in each of a plurality of divided areas of an object. A plurality of measurements from the photo-metering unit are supplied to a CPU 15. Numeral 19 denotes a film sensitivity detection unit for reading a code number applied to a side surface of a loaded film cartridge. The film sensitivity information is supplied from the detection unit 19 to the CPU 15.

Numeral 20 denotes an actuation switch including switches linked to a release button and a setting button such as an exposure mode setting button, and a timing switch for detecting a sequence state of the camera. The state information of the camera is supplied from the timing switch 20 to the CPU 15.

The CPU 15 is electrically connected to a driver unit 16 by the flexible printed circuit board, not shown, arranged as one of the electrical parts of the camera main body. The CPU 15 and the driver unit 16 are electrically connected to the flexible printed circuit board 9 of the shutter device by connecting the connecting part 9a of the flexible printed circuit board of the shutter device to the flexible printed circuit board, not shown.

In the above configuration, the drive is controlled by the CPU 15 through the driver unit 16 in the following manner.

An LCD 21 is driven to display information on the exposure and operation mode settings and alarm information. A diaphragm 22 in a lens, not shown, is driven to control the light intensity passed therethrough. A motor 23 is driven to wind up and rewind the film and charge the drive mechanism 2.

Further, the electrical parts of the shutter drive mechanism 2 are driven by the CPU 15 through the connecting part 9a of the flexible printed circuit board 9 to control the shutter speed. The traveling state detection unit 8 is controlled by the CPU 15 through the driver unit 16 and the connecting part 9a and the signal produced by the detection unit 8 is supplied to the CPU 15.

Figure 5:
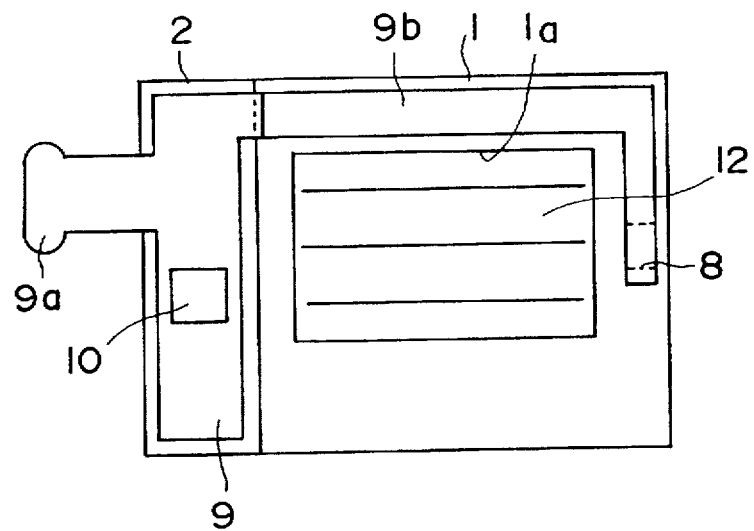
FIG. 5 is a top view of a second embodiment of the shutter device of the present invention.
Figure 6:
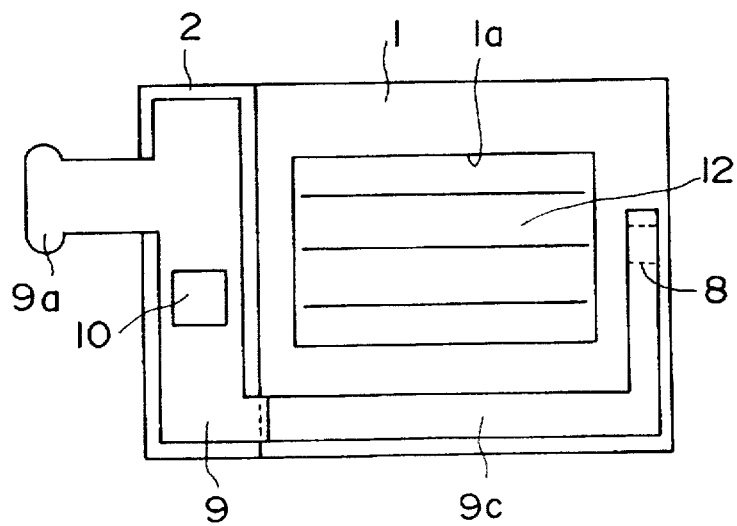
FIG. 6 is a top view of a third embodiment of the shutter device of the present invention.

FIGS. 5 and 6 show second and third embodiments of the present invention. In FIG. 5, the flexible printed circuit board 9 has only the pattern 9b which is shown above the aperture 1a. In FIG. 6, the flexible printed circuit board has only the pattern 9c which is shown below the aperture 1a. The electrical parts of the shutter drive mechanism 2 and the traveling state detection unit 8 are electrically connected by the patterns 9b and 9c, respectively.

Figure 7:
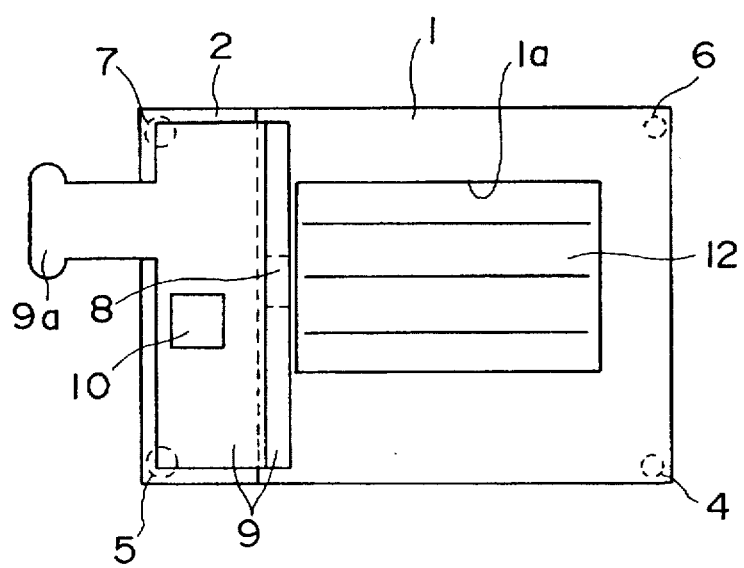
FIG. 7 is a top view of other embodiment of the shutter device of the present invention.

In the embodiments shown in FIGS. 1, 5 and 6, the shutter mechanism 2 is arranged on the opposite side of the traveling state detection unit 8 through the aperture 1a of the shutter base plate 1. In other embodiment shown in FIG. 7, the traveling state detection unit 8 is arranged in the vicinity of the shutter drive mechanism 2, and the flexible printed circuit board 9 is applied in the manner described above to achieve the object of the present invention.

In accordance with the present invention, since the flexible printed circuit board for the electrical connection with the shutter drive mechanism and the traveling state detection unit is provided, the connecting part for the electrical parts of the camera main body may be arranged at one area on the flexible printed circuit board. Accordingly, the assembling time is saved and the cost is suppressed to a low level.

Figure 8:
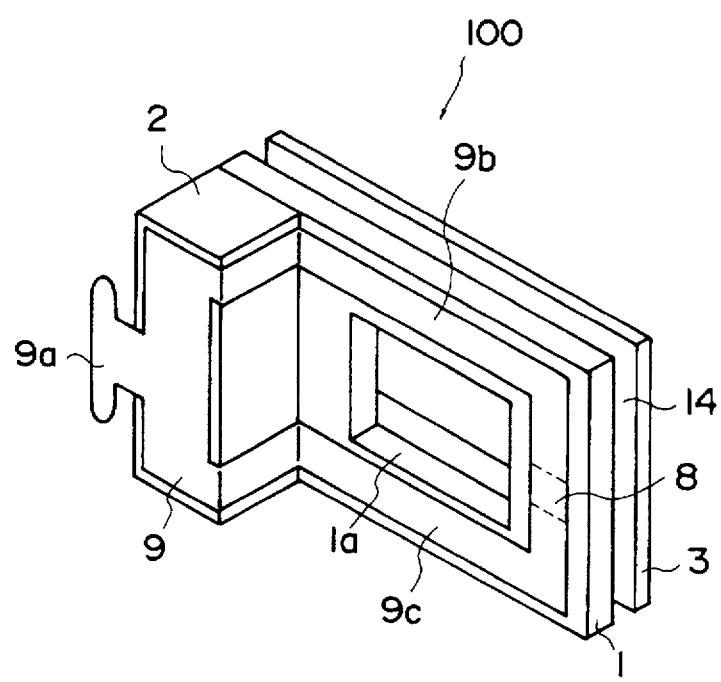
FIG. 8 is a schematic perspective view illustrating a shutter device 100.

FIG. 8 is a schematic perspective view illustrating a shutter device 100 in the first embodiment, which device incorporates the traveling state detection unit. The following is an explanation of this shutter device.

As illustrated in FIG. 8, the shutter base plate and the cover plate 3 are so disposed substantially in parallel as to be spaced from each other through shafts 4, 5, 6 and 7. A blade chamber 14 is formed therebetween. The shutter blades and a drive arm are nested in this blade chamber 14.

The shutter base plate 1 is formed with the aperture 1a for the exposure. Further, the cover plate 3 is similarly formed with, though not illustrated, an aperture. The shutter drive mechanism 2 is provided leftward of the aperture 1a on the shutter base plate 1 in FIG. 8. The shutter drive mechanism 2 drive-controls the shutter blades through the above drive arm. This shutter drive mechanism 2 is constructed of a drive mechanism inclusive of a spring of the shutter blades, a control mechanism, including an electromagnet or the like, for controlling a shutter speed and a charge mechanism for charging these mechanisms.

A traveling state detection unit 8 (hereinafter simply termed a detection unit) for detecting a traveling state of the shutter blades is disposed rightward of the aperture 1a in FIG. 8.

The shutter device 100 has a flexible printed circuit board (hereinbelow abbreviated to an FP board) 9 for mounting the electric parts is attached to the shutter drive mechanism and the shutter base plate 1. The FP board 9 is electrically connected to the electromagnet within the shutter drive mechanism 2 and the detection unit 8, respectively. A part 9a, protruding leftward in FIG. 8, of the above FP board is a connecting part for an electrical connection to another unillustrated FP plate.

Figure 9:
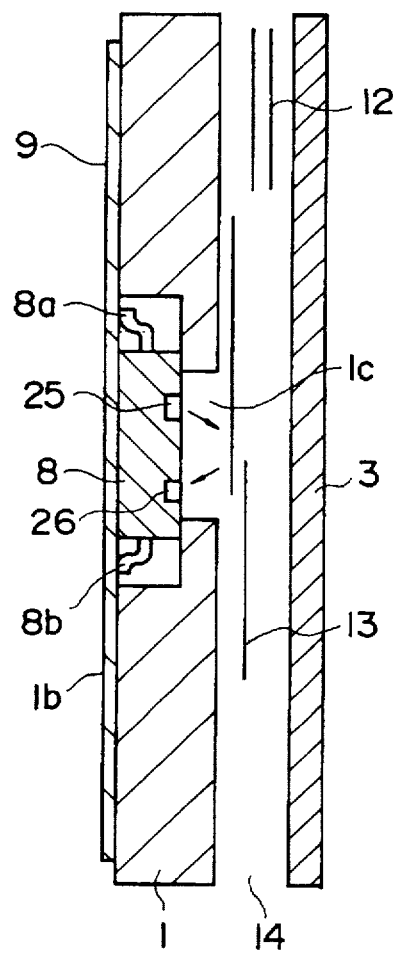
FIG. 9 is a sectional view fully illustrating a structure of a traveling state detection unit 8 of FIG. 8.

FIG. 9 is a sectional view of assistance in explaining a structure of the detection unit 8 of FIG. 8 in greater detail. This detection unit 8 in FIG. 9 is secured to a recess 1b of the shutter base plate 1 by a known bonding process or the like. Further, the detection unit 8 is provided with a light emitting element 25 and a light receiving element 26. The light emitted from the light emitting element 25 via a detection hole 1c is reflected by a shutter leading curtain 12 or a shutter trailing curtain 13, whereby the light receiving element 26 receives the light. The detection unit 8 thus detects the traveling states of the shutter leading curtain 12 and the shutter trailing curtain. This detection unit 8 is electrically connected to a conductive pattern area of the FP board 9 through a plurality of terminals 8a and 8b. The detection unit 8 itself outputs a state-of-travel signal of the above detection to the conductive pattern area of the FP board 9.

As illustrated in FIG. 8, when the detection unit 8 is disposed rightward of the aperture 1a, the state-of-travel signal of the above detection has to be outputted to the shutter drive mechanism 2 or the connecting part 9a via the pattern area 9b positioned above the aperture 1a on the FP board 9 or via the pattern area 9c positioned below the aperture 1a. It is difficult to secure a space for setting the upper pattern area 9b of the FP board 9 in an upper portion of the aperture 1a because of the close proximity to a finder unit of the camera as known well. Further, as also known well, a shake preventive mechanism in tripping the shutter blades is disposed in the lower portion of the aperture 1a, and, hence, there arises a problem in which the space for setting the lower pattern area 9b is also hard to secure.

To obviate this problem, the detection unit 8 is placed in an area exclusive of the area where the shutter drive mechanism 2 is disposed with respect to a portion, positioned leftward of the aperture 1a, of the shutter base plate 1. The detection unit 8 may be electrically connected to a part of the FP board 9. However, the shutter drive mechanism 2 is, as explained earlier, constructed of the plurality of mechanisms, and hence, if the mechanism 2 increases in size, it follows that the detection unit 8 is hard to install.

The following is a discussion of an embodiment for obviating the above problems.

Figure 10:
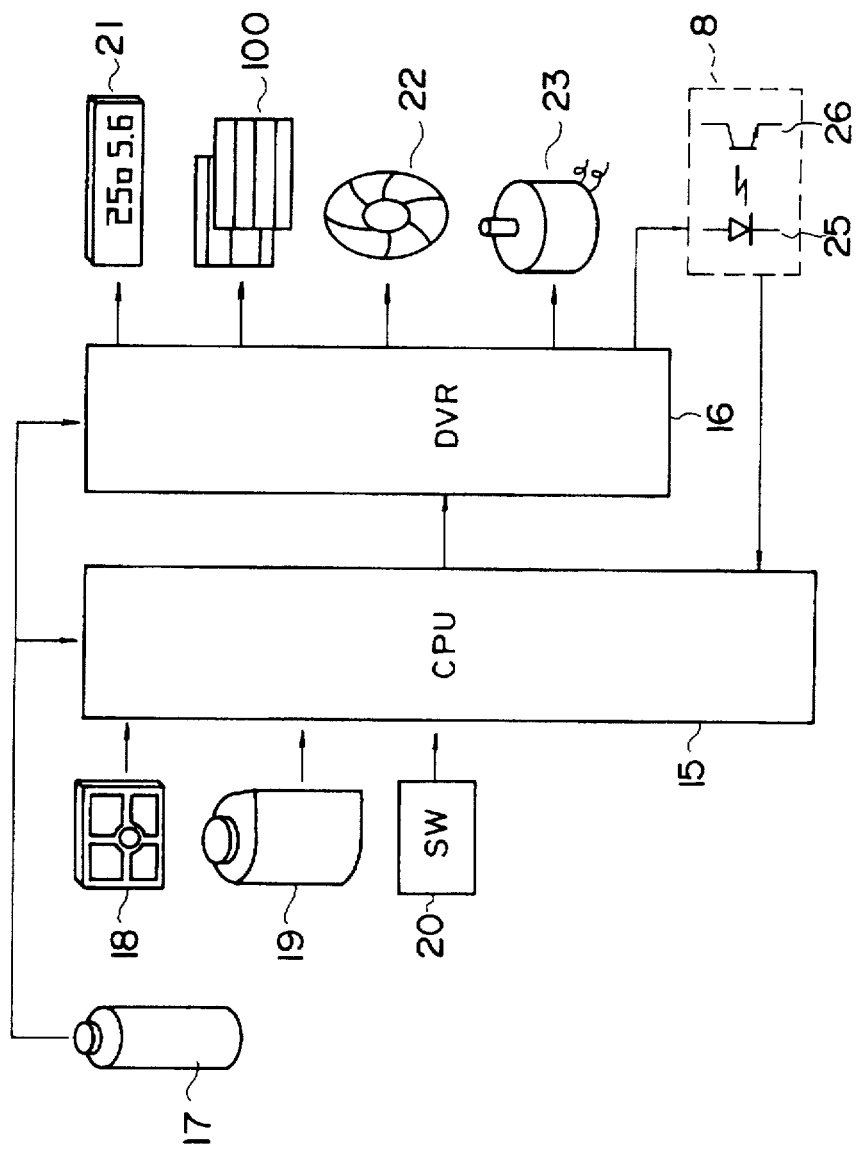
FIG. 10 is a block diagram illustrating a configuration of a circuit in the interior of the camera according to the present invention.

FIG. 10 is a block diagram depicting an internal configuration of a circuit of the camera according to the present invention. In this circuit, a battery 17 provided on the left side in FIG. 10 serves as a power supply, and the principal control is executed by the CPU 15.

Signals are inputted to the CPU 15 in the following manner.

A photo-metering unit 18 in FIG. 10 measures a brightness of the object through a plurality of divided areas. This photo-metering unit 18 inputs photometric values to the CPU 15.

A film sensitivity detection unit 19 reads signals of codes provided on an outer peripheral surface of a film cartridge. This detection unit 19 inputs an item of film sensitivity data to the CPU 15. Note that the film sensitivity data is not inputted to the CPU 15 in the case of a cartridge provided with no code signal.

An actuation switch 20 includes a manual operation switch containing a switch interlocking with a release button and a setting button and also a timing switch for detecting a state-of-sequence of the camera. An item of camera state data is inputted to the CPU 15 through this actuation switch 20.

The output from the CPU 15 works to effect the following drive via the driver unit 16.

A liquid crystal display LCD 21 is driven to display-control the data on setting of an exposure mode and an operation mode as well as on an alarm.

The numeral 100 designates the above-mentioned shutter device. The shutter drive mechanism 2 of the shutter device 100 is controlled by the output given from the CPU 15 through the driver unit 16.

The numeral 22 represents a diaphragm unit. A quantity of light passing through a photographing lens is regulated by drive-controlling the diaphragm unit 22. The numeral 23 denotes a motor for feeding the film. This motor 23 is driven, thereby carrying out a wind-up and a rewind of the film.

The numeral 8 designates a traveling state detection unit for the shutter blades. As explained above, the light emitting element 25 emits the light, and the light receiving element 26 receives the light reflected by the shutter leading curtain or the shutter trailing curtain. With this operation, the detection unit 8 itself outputs a state-of-travel detection signal to the CPU 15.

Figure 11:
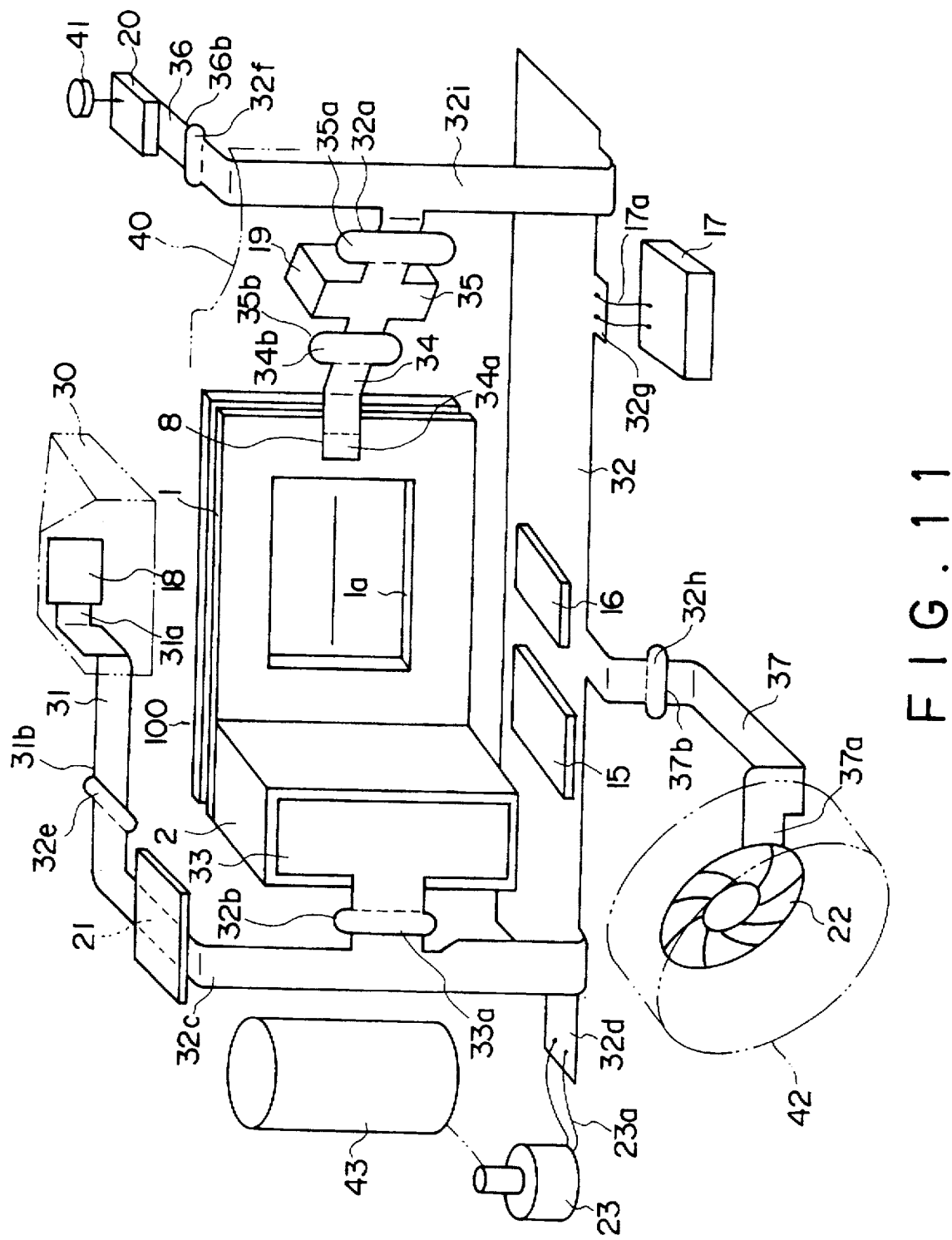
FIG. 11 is a perspective view of a fourth embodiment of the present invention but shows a mounting configuration of the interior of the camera.

FIG. 11 is a perspective view of a fourth embodiment of the present invention but shows an internal mounting configuration of the camera.

In FIG. 11, the finder 30 incorporates the photo-metering unit 18 in the upper portion of the shutter device 100. This photo-metering unit 18 is electrically connected to a connecting part 31a of a first FP board 31. The first FP board 31 has a connecting part 31b electrically connected to the other connecting part 32e. The connecting part 32e is provided integrally with a branch member 32c of a second FP board 32 located in the lower portion of the shutter device 100. The liquid crystal display LCD 21 is connected to this branch member 32c.

Through these connections, the CPU 15 on the second FP board 32 can be electrically connected to the photo-metering unit 18 via the first FP board 31 and the branch member 32c. Further, the liquid crystal display LCD 21 can be also electrically connected to the driver unit 16 on the same board 32.

A third FP board 33 is provided on the shutter drive mechanism 2, positioned, as seen in the Figure, on the left side of the shutter base plate 1 in the shutter device 100. The electromagnet in the shutter drive mechanism 2 can be electrically connected to the driver unit 16 on the second FP board 32 through a connecting part 33a thereof and the other connecting part 32b electrically connected thereto.

The above traveling state detection unit 8 is disposed, as seen in the Figure, on the right side of the shutter base plate 1. This detection unit 8 is electrically connected to a fourth FP board 34 including a connecting part 34a.

This FP board 34 is electrically connected to a fifth FP board 35 provided on the film sensitivity detection unit 19 via a connecting part 34b thereof and the other connecting part 35b electrically connected thereto. This FP board 35 is electrically connected to a branch member 32i extending from the second FP board 32 via a connecting part 35a thereof and the other connecting part 32a electrically connected thereto.

The above film sensitivity detection unit 19 includes code reading pins provided in a cartridge chamber 40 formed, as indicated by an alternate long and two short dashes line in the Figure, in the interior of the camera. The CPU 15 on the second FP board 32 can be electrically connected to the film sensitivity detection unit 19 via the respective connecting parts 35a, 32a and the branch member 32i.

Further, the traveling state detection unit 8 can be also electrically connected to each of the CPU 15 on the second FP board 32 and the driver unit 16 via the respective FP boards 34, 35 and the branch member 32i. The CPU 15 and the driver unit 16 constitute a drive control unit for drive-controlling the whole functions of the camera main body. In accordance with the embodiment of FIG. 11, the fourth FP board 34, the fifth FP board 35 and the second FP board 32 including the branch member 32i are combined to constitute a connection unit for electrically connecting the above drive control unit to the traveling state detection unit 8.

The branch member 32i is electrically connected to the actuation switch 20 for reading a state of a setting button 41 via the connecting part 32f positioned above the branch member 32i and a sixth FP board 36 including the other connecting part 36b thereof. The CPU 15 on the second FP board 32 is electrically connected to the actuation switch 20 through the FP board 36 and the branch member 32i.

Note that the actuation switch 20 is constructed to read, though not illustrated, an operating state of the release button.

A connecting part 32g protruding in the vicinity of the branch member 32i disposed, as seen in the Figure, on the right side of the second FP board 32 is connected via a lead wire 17a to the battery 17. The battery 17 can be electrically connected to each of the CPU 15 and the driver unit 16 via the connecting part 32g and the lead wire 17a.

A connecting part 32h, protruding in close proximity to the driver unit 16, of the second FP board 32 is electrically connected to a seventh FP board 37 including the other connecting part 37b electrically connected thereto. A connecting part 37a positioned at the other end of the FP board 37 is electrically connected to the diaphragm unit 22. The driver unit 16 on the second FP board 32 can be electrically connected to the diaphragm unit 22 through the seventh FP board 37. The diaphragm unit 22 controls the quantity of light passing through a lens 42 with the aid of the driver unit 16.

A connecting part 32d, protruding leftward in the Figure, of the second FP board 32 is connected to the motor 23 via the lead wire 23a. With the aid of the driver unit 16 on the second FP board 32, the motor 23 drive-controls a spool 43, thereby winding the film. Further, the motor 23 drive-controls a rotary shaft of the cartridge chamber 40 through an unillustrated transmission unit, thereby rewinding the film.

The above construction being thus taken, the FP boards may not be disposed in the respective areas located upwardly and further downwardly of the aperture 1a on the shutter base plate 1. The electric connections, exhibiting a high efficiency, of the respective units in the interior of the camera can be attained with the FP boards.

Note that the drive relationships between the respective units such as the photo-metering unit 18, etc. and the CPU 15 or the driver unit 16 through the individual FP boards 31 to 37 are as explained above with reference to FIG. 10, and, hence, the explanation thereof will be omitted herein.

Figure 12:
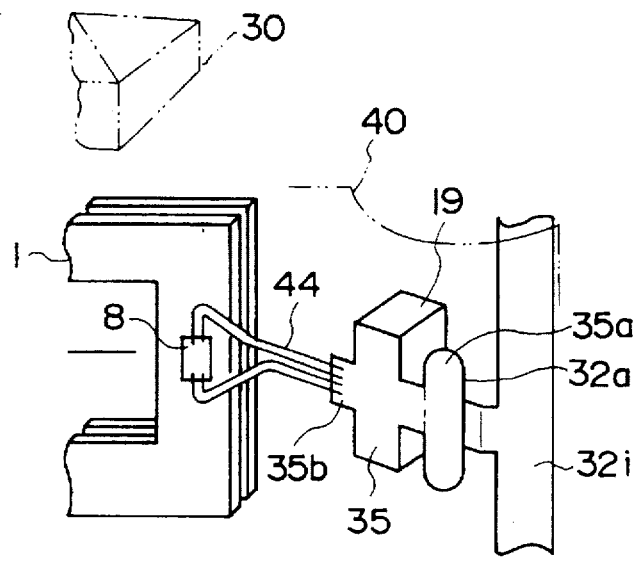
FIG. 12 is a view of a fifth embodiment of the present invention but illustrates only different points from the structure of FIG. 11.

FIG. 12 is a view of a fifth embodiment of the present invention but illustrates only different points from the structure of FIG. 11. Configurations other than those of FIG. 12 are the same with FIG. 11.

As shown in FIG. 12, instead of the fourth FP board 34 of FIG. 11, a lead wire 44 is provided between the fifth FP board 35 and the traveling state detection unit 8 disposed in the right portion of the shutter base plate 1. This lead wire 44 electrically connects the traveling state detection unit 8 to the fifth FP board 35.

With this arrangement, the detection unit 8 can be electrically connected to each of the driver unit 16 and the CPU 15 of FIG. 11 through the lead wire 44, the fifth FP board 35 and the second FP board 32 including the branch member 32i. In accordance with the embodiment of FIG. 12, the lead wire 44, the fifth FP board 35 and the second FP board 32 inclusive of the branch member 32i are combined to constitute the above connection unit.

Figure 13:
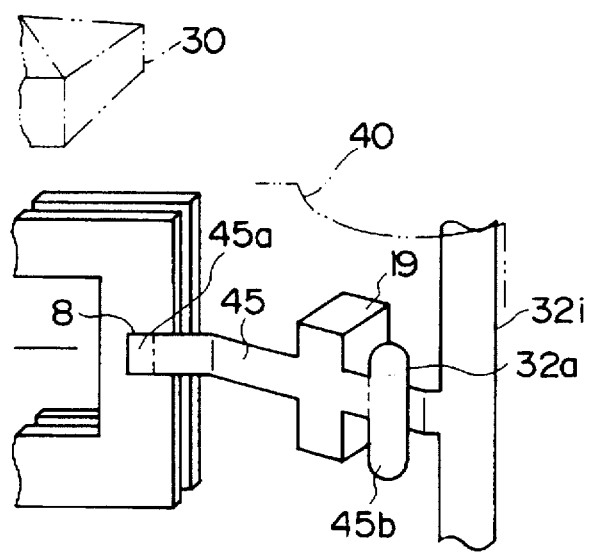
FIG. 13 is a view of a sixth embodiment of the present invention but illustrates only different points from the structure of FIG. 11.

FIG. 13 is a view of a sixth embodiment of the present invention but illustrates only different points from the structure of FIG. 11. Configurations other than those in FIG. 13 are the same with FIG. 11.

FIG. 13 illustrates a structure in which the fourth FP board 34 and the fifth FP board 35 of FIG. 11 are combined. That is, as depicted in FIG. 13, one end 45a of an FP board 45 is electrically connected to the detection unit 8. Further, a connecting part 45b at the other end thereof is electrically connected to the connecting part 32a of the branch member 32i of FIG. 11. The film sensitivity detection unit 19 is electrically connected to the FP board 45 between the respective connecting parts 45a and 45b. The film sensitivity detection unit 19 can be electrically connected to the CPU 15 of FIG. 11 through the FP board 45 and the second FP board 32 inclusive of the branch member 32i.

Moreover, the detection unit 8 of FIG. 13 can be electrically connected to each of the driver unit 16 and the CPU 15 of FIG. 11 via the FP board 45, the second FP board 32 and the branch member 32i as well in FIG. 13. In this embodiment, the FP board 45 and the second FP board including the branch member 32i in FIG. 13 are combined to constitute the above connection unit.

Figure 14:
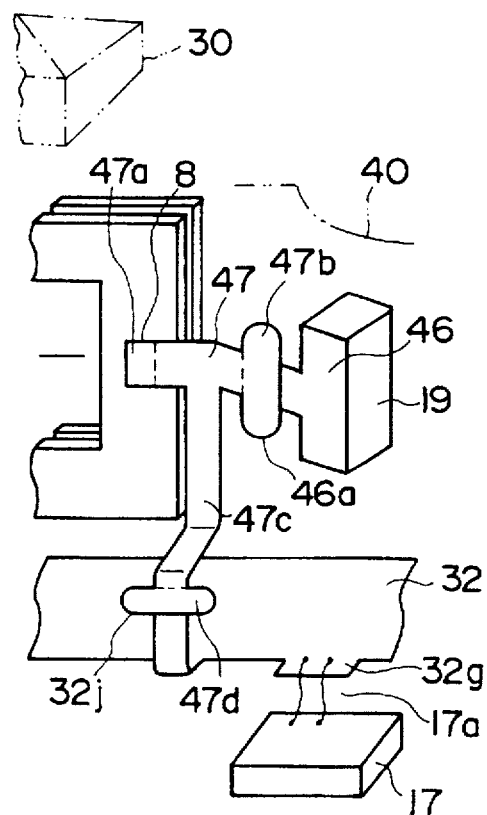
FIG. 14 is a view of a seventh embodiment of the present invention but illustrates only different points from the structure of FIG. 11.

FIG. 14 is a view of a seventh embodiment of the present invention but shows only different points from the structure of FIG. 11. Configurations other than those in FIG. 14 are the same with FIG. 11.

Removing the fourth FP board 34 and the connecting part 32a of the branch member 32i in FIG. 11, as illustrated in FIG. 14, another FP board 46 is electrically connected to the film sensitivity detection unit 19; and a connecting part 46 thereof is electrically connected to a connecting part 47b provided at the other end. The FP board 47 including its connecting part 47b is formed with a branch member 47c protruding toward the second FP board 32. A connecting part 47d thereof is electrically connected to the connecting part 32j projecting from the second FP board 32. The FP board 47 has a connecting part 47a at its one end, and the connecting part 47a is electrically connected to the traveling state detection unit 8.

Accordingly, the film sensitivity detection unit 19 is electrically connected to the CPU 15 of FIG. 11 through the respective FP boards 46, 47 and the second FP board 32. The traveling state detection unit 8 can be also electrically connected to each of the driver unit 16 and the CPU 15 of FIG. 11 through the respective FP boards 47, 32. Note that the FP boards 47, 32 constitute the above connection unit.

Figure 15:
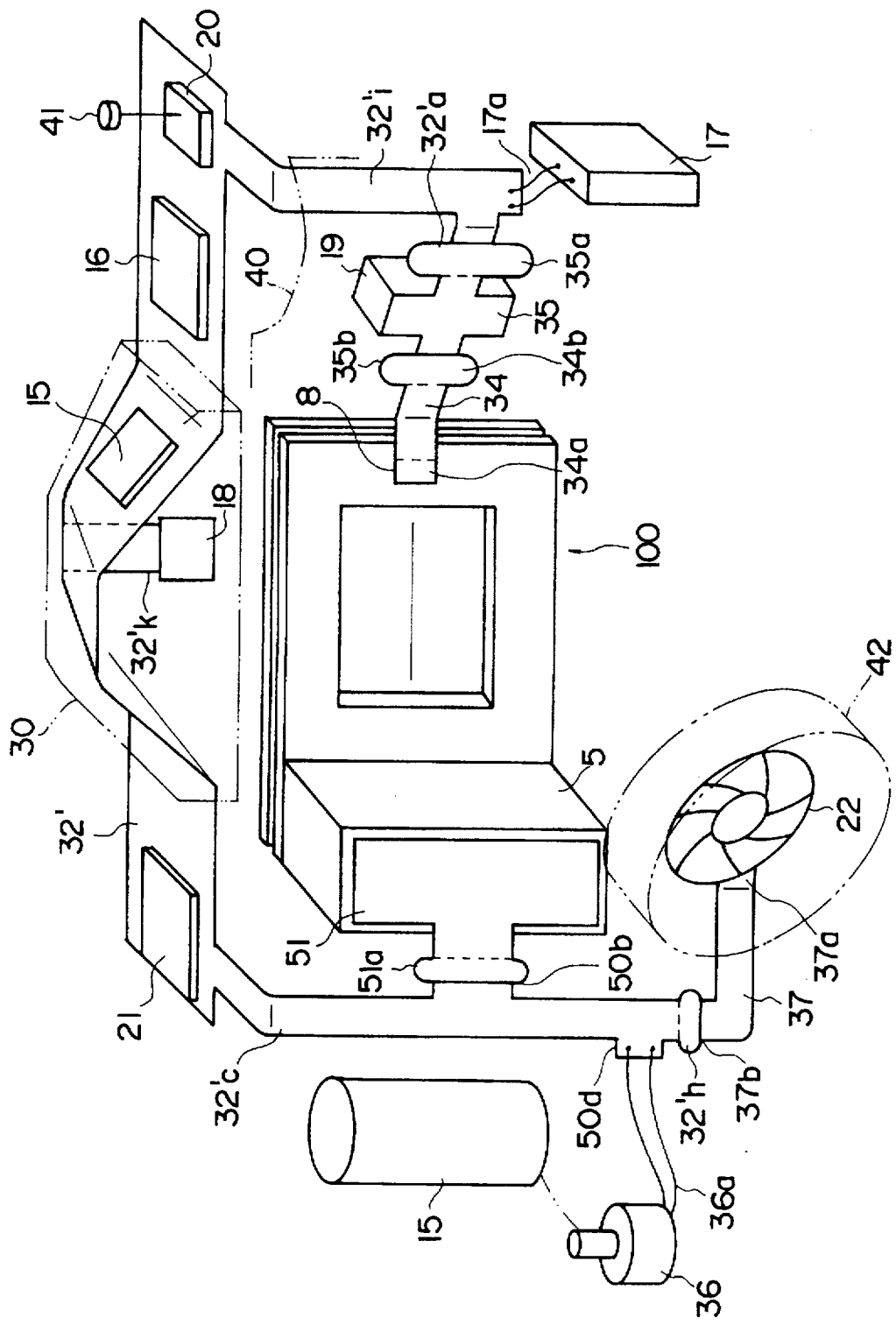
FIG. 15 is a view of an eighth embodiment of the present invention but illustrates a state where a second FP board 32 of FIG. 11 is disposed on an upper portion of the shutter device 100.

FIG. 15 is a view of an eighth embodiment of the present invention but illustrates a state where the second FP board 32 of FIG. 11 is placed on the upper portion of the shutter device 100.

Referring to FIG. 15, a second FP board 32' is mounted with, sequentially from the left to the right of a prism, i.e., a finder 30, the liquid crystal display LCD 21, the CPU 15, the driver unit 16 and the actuation switch 20. The photometering unit 18 incorporated in the prism 30 is electrically connected to a connecting part 32'k protruding downward from the FP board 32'.

One end of a branch member 32'i, protruding on the right side in the Figure, of the above FP board 32' is electrically connected to the battery 17 via a lead wire 7a. One end 32'h of a branch member 32'c on the left side is electrically connected to the diaphragm unit 22 through the seventh FP board 37 inclusive of the connecting part 37b.

In accordance with this embodiment also, as in the same way with FIG. 11, the fourth FP board 34, the fifth FP board 35 and the second FP board 32' including the branch member 32'i constitute the above connection unit. The connection relationships between the drive control units 15, 16 and the respective units in FIG. 15 are the same as those in FIG. 10, and, therefore, the explanation will be omitted herein.

In accordance with the embodiments discussed above, the traveling state detection unit 8 is mounted on the shutter base plate 1 as a part employed for the unit shutter. According to the present invention, however, instead of the traveling state detection unit 8, there is provided a shutter operating state detection unit, e.g., a unit for detecting a traveling speed or a result of traveling. A connection unit for electrically connecting this shutter operating state detection unit to the above drive control units 15, 16 may be disposed in an area other than the areas positioned upwardly and downwardly of the aperture 1a on the shutter base plate 1. This arrangement is, as a matter of course, applicable to the present invention.

Alternatively, in addition to the drive control units 15, 16 for drive-controlling the whole functions of the camera main body, there is provided, e.g., a control unit for driving only the above traveling state detection unit or the detection unit for detecting the traveling speed or the result of traveling. A connection unit for electrically connecting the control unit to the detection unit may be disposed in an area other than the areas positioned upwardly and downwardly of the aperture 1a in the same way as the foregoing.

As discussed above, according to the present invention, even when the FP board can not be disposed in the upper and lower areas of the aperture of the shutter base plate, the above connection unit can be disposed in an area other than these areas. It is therefore possible to secure the spaces for respectively installing the shake preventive mechanism in traveling the shutter blades and the finder unit of the camera. A high-efficiency mounting configuration of the camera as a whole can be attained simply by using the above connection units.

Further, a variety of constructions can be taken by way of mounting configurations, and, hence, there is obtained an advantage of flexibly corresponding to constraints in terms of designing and manufacturing as well.

It is apparent that, in this invention, a wide range of different working modes can be formed based on the invention without deviating from the spirit and scope of the invention. This invention is not restricted by its specific working modes except being limited by the appended claims.

What is claimed is:

1. A shutter device comprising:
   shutter blades;
   a shutter base plate having an aperture;
   a flexible printed circuit board electrically connectable to a camera main body, and bonded to said shutter base plate;
   a shutter drive mechanism arranged in the vicinity of said aperture and bonded to said shutter base plate for driving said shutter blades; and
   electrical parts arranged in the vicinity of said aperture and on said flexible printed circuit board at an area other than the area of arrangement of said shutter drive mechanism for detecting a state of said shutter blades;

said flexible printed circuit board being connected to said shutter drive mechanism and said electrical parts and continuously arranged along the periphery of said aperture.

2. A shutter device according to claim 1, wherein said electrical parts detect a traveling state of said shutter blades.

3. A shutter device according to claim 1, wherein said shutter drive mechanism is arranged in the vicinity of one side of said aperture, and said electrical parts are arranged in the vicinity of the opposite side to said one side.

4. A flexible printed circuit board comprising:

a surface portion mountable on a shutter base plate having an aperture, said surface portion having a shape which circumscribes said aperture;

a first conductor element, formed on said flexible printed circuit board along a first portion of said aperture, for electrical connection with a shutter drive mechanism arranged on said shutter base plate;

a second conductor element, formed on said flexible printed circuit board along a second portion of said aperture, for electrical connection with a shutter state detector arranged on said shutter base plate; and a third conductor element, formed on said flexible printed circuit board at a different area from the areas occupied by said first and second conductor elements of said flexible printed circuit board, for electrically connecting said shutter drive mechanism and said shutter state detector to a camera main body.

5. A shutter device comprising:

a shutter base plate having an aperture for an exposure;

electrical parts, different from a shutter drive mechanism, and mounted on said shutter base plate, adjacent to one side portion of said aperture for detecting a state of a shutter; and a connecting unit which electrically connects said electrical parts to internal parts of a camera main body other than parts mounted on said shutter base plate when said shutter base plate is installed in the camera main body, wherein said connecting unit is disposed in an area other than areas of said shutter base plate which are positioned upwardly and downwardly of said aperture, and comprises a flexible printed circuit board bonded to said shutter base plate.

6. A shutter device according to claim 5, wherein said electrical parts detect a traveling state of shutter blades.

7. A shutter device according to claim 5, wherein said connecting unit includes a lead wire.

8. A shutter device according to claim 6, wherein said internal parts of the camera main body drive-control all the functions of the camera main body.

9. A shutter device according to claim 5, further comprising:

a shutter drive mechanism disposed on said shutter base plate adjacently to the other side portion located in face-to-face relationship with said one side portion of said aperture, said shutter drive mechanism having an arm and shutter blades and driving said shutter blades through said arm.

* * * * *